Oct. 15, 1929.   N. MAMBOURG   1,731,248
GLASS MELTING FURNACE
Filed June 4, 1924
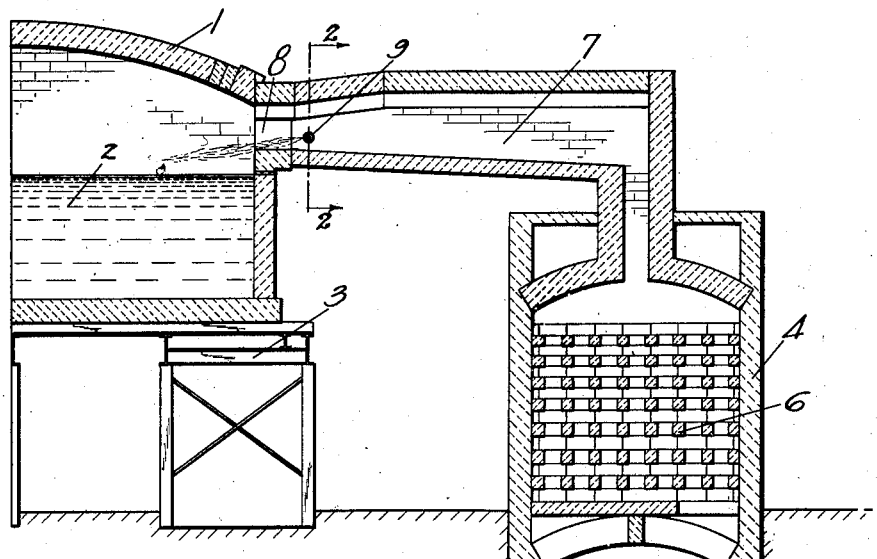
FIG.1
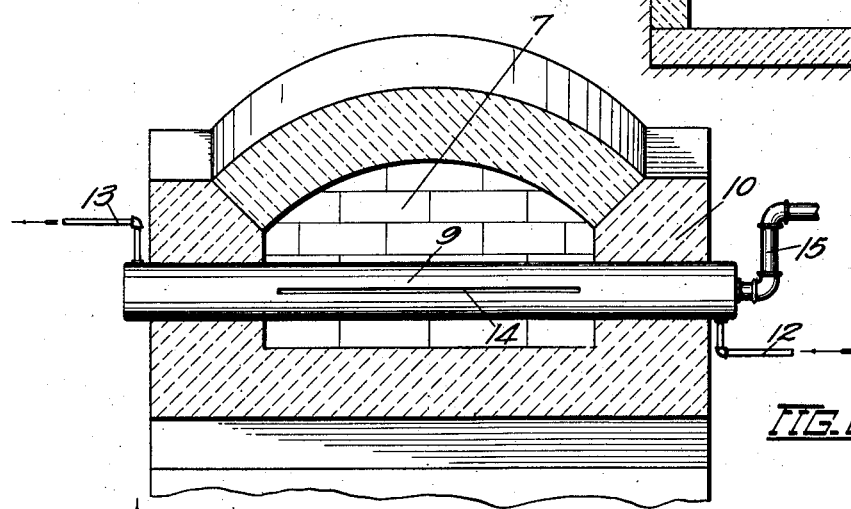
FIG.2
FIG.3
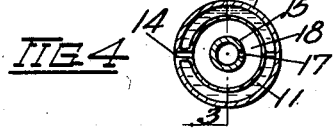
FIG.4
INVENTOR.
Nestor Mambourg
C. A. Rowley
ATTORNEY.

Patented Oct. 15, 1929

1,731,248

UNITED STATES PATENT OFFICE

NESTOR MAMBOURG, OF LANCASTER, OHIO, ASSIGNOR TO THE LIBBEY-OWENS GLASS COMPANY, OF TOLEDO, OHIO, A CORPORATION OF OHIO

GLASS-MELTING FURNACE

Application filed June 4, 1924. Serial No. 717,709.

This invention relates to improvements in glass melting furnaces, and more particularly to an improved type of burner for use in connection therewith.

In the usual glass melting furnace of the regenerator type, heated air is conducted to the furnace through a closed passage terminating in a port in the side wall of the furnace somewhat above the glass level, and gas is injected into this heated air from nozzles extending through the side walls of the air passage adjacent the port.

According to the present invention the gas pipe extends transversely through the air passage at a location near the entrance to the furnace, the pipe being provided with a longitudinal series of holes or openings through which the gas is forced out. The pipe is surrounded by a hollow cylindrical shield or shell mounted in the side walls of the passage, the shield having a long narrow slot in that side thereof facing the port or furnace opening. The gas blown out from the gas pipe fills the space within the hollow shield and flows out through the slot to combine with the air and form a wide continuous sheet of flame under low pressure, this being highly desirable in the glass melting process. The walls of the shield are hollow and a continuous flow of cooling fluid such as water is maintained therethrough to protect the shield and burner pipe from the excessive heat to which they are constantly subjected within the regenerator port.

The invention will be more clearly understood from the following detailed description of one approved form of the apparatus.

In the accompanying drawings:

Fig. 1 is a transverse vertical section through one of the regenerators and half of the glass melting furnace.

Fig. 2 is a transverse vertical section through one of the air passages, on an enlarged scale, this view being taken substantially on the line 2—2 of Fig. 1.

Fig. 3 is a longitudinal vertical section through the burner assembly, taken substantially on the line 3—3 of Fig. 4.

Fig. 4 is a transverse vertical section taken substantially on the line 4—4 of Fig. 3.

At 1 is shown a portion of the glass melting furnace which contains the pool of molten glass 2, this furnace being mounted on any suitable supporting structure such as indicated at 3. At each side of the tank is a series of regenerators 4, these regenerators being arranged in pairs opposite one another at either side of the furnace. Air for combustion purposes is drawn in through tunnel 5 from some point remote from the furnace. This air passes up through the heated checker-work 6 and passage 7 and enters the furnace chamber above the molten glass through port 8. The gas is fed into the passage adjacent port 8 and burns with the oxygen of the heated air to form the fire which melts the glass-producing materials. The heated gases pass out through an exactly similar regenerator on the opposite side of the tank and serve to heat up the checker-work 6 therein before passing out through the stack. At intervals the direction of fire is reversed to reheat the checker-work in the regenerators so that a continuous supply of heated air through passage 7 may always be maintained.

The present invention is concerned more particularly with an improved type of burner for supplying gas which combines with the heated air in passage 7. According to this invention a substantially closed cylindrical metallic member or shield 9 is positioned transversely of passage 7 adjacent port 8, being mounted in the side walls 10 of the passage as shown more particularly in Fig. 2. This cylindrical shield 9 is provided with hollow walls, and the space 11 therein is filled with a constantly renewed supply of cooling fluid such as water. This fluid will be forced in through pipe 12 at one end and flows out through a similar pipe 13 at the opposite end.

Shield 9 is provided with a narrow slot 14 in that side thereof facing the port 8, this slot being substantially as long as the width of air passage 7.

A gas pipe 15 extends centrally through the shield 9, being supported in the ends 16 of the shield. Pipe 15 is provided with a series of outlet openings 17 for the gas, this row of openings being preferably in the side of the pipe opposite the slot 14 in shield 9. The gas which is forced out through openings 17 will fill the space 18 in the shield and flow out, under low pressure, through the slot 14. It then combines with the heated air flowing in through passage 7 to form a wide sheet of flame which passes into the furnace under low pressure and produces a soft fire most desirable for melting the glass-producing materials.

The wide sheet of flame which is substantially parallel to the upper surface of the molten pool 2 will be most efficient in imparting its heat to a wide area of the surface of the glass. The substantially air-tight fit made by shield 9 with the side walls 10 of the air passage prevents the inflow of cold air at these points, which usually goes in around the type of burner nozzles now in use. so that the entire supply of air for combustion purposes must pass through the heated checker-work, thus securing a most efficient fire. The constant flow of cooling fluid through the protecting shield 9 will prevent any destructive action on the burner parts due to the intense heat to which they are subjected in the closed air passage.

Claims:

1. In combination, a glass melting furnace having a passage for feeding heated air thereto, a gas-pipe extending transversely of the passage and provided with openings through which the gas may issue and a slotted member surrounding said gas-pipe.

2. In combination, a glass melting furnace having a passage for feeding heated air thereto, a cylindrical gas-pipe extending transversely of the passage and provided with a longitudinal series of openings through which the gas may issue and a cylindrical slotted member surrounding said gas-pipe.

3. In combination, a glass melting furnace having a passage for feeding heated air thereto, a gas-pipe extending transversely of the passage and provided with openings through which the gas may issue into the passage, and a cylindrical internally cooled shield surrounding said gas-pipe.

4. In combination, a glass melting furnace having a passage for feeding heated air thereto, a cylindrical shield extending transversely of the passage, and having a longitudinal slot on the side toward the furnace, a gas-pipe extending through the shield, and provided with openings for permitting gas to issue into the interior of the shield, and thence through the slot to the passage.

5. In combination, a glass melting furnace having a passage for feeding heated air thereto, a cylindrical shield extending transversely of the passage, and having a longitudinal slot on the side toward the furnace, a gas-pipe extending through the shield, and provided with openings in the side opposite the slot for permitting gas to issue into the interior of the shield, and thence through the slot to the passage.

6. In combination, a glass melting furnace having a passage for feeding heated air thereto, a cylindrical shield having internally cooled walls extending transversely of the passage, and having a longitudinal slot on the side toward the furnace, a gas-pipe extending through the shield, and provided with openings for permitting gas to issue into the interior of the shield, and thence through the slot to the passage.

7. In combination, a glass melting furnace having a passage for feeding heated air thereto, a cylindrical shield having hollow water-cooled walls extending transversely of the passage, and having a longitudinal slot on the side toward the furnace, a gas-pipe extending through the shield, and provided with openings for permitting gas to issue into the interior of the shield, and thence through the slot to the passage.

8. In combination a glass furnace having a passage for feeding heated air thereto, a burner arranged within said passage and comprising a hollow cylindrical shield having a longitudinal slot in one side thereof, and a gas-pipe extending longitudinally through the shield and having openings communicating with the interior of the shield.

9. In a glass furnace, a burner comprising a hollow shield having internally cooled walls which have a longitudinal slot in one side thereof, and a gas-pipe extending longitudinally through the shield and having openings communicating with the interior of the shield.

10. In a glass furnace, a burner comprising a hollow shield having hollow water-cooled walls which have a longitudinal slot in one side thereof, and a gas-pipe extending longitudinally through the shield and having openings communicating with the interior of the shield.

11. In a glass furnace, a burner comprising a hollow shield having internally cooled inner and outer cylindrical walls which have a longitudinal slot in one side thereof, and a gas-pipe extending longitudinally through said shield, said gas-pipe being spaced from said cylindrical walls and provided with a plurality of openings communicating with the interior of said shield.

12. In a glass furnace, a burner comprising a hollow shield having spaced inner and outer cylindrical walls which have a longitudinal slot in one side thereof, means for creating a continuous circulation of cooling medium between said inner and outer walls, and a gas-pipe extending longitudinally through said shield, said gas-pipe being spaced from said cylindrical walls and provided with a longitudinal series of openings communicating with the interior of said shield.

Signed at Lancaster, in the county of Fairfield and State of Ohio, this 31st day of May, 1924.

NESTOR MAMBOURG.